(No Model.) 2 Sheets—Sheet 1.
C. WHITFORD.
COMBINED PULVERIZER AND LAND MARKER.
No. 574,468. Patented Jan. 5, 1897.
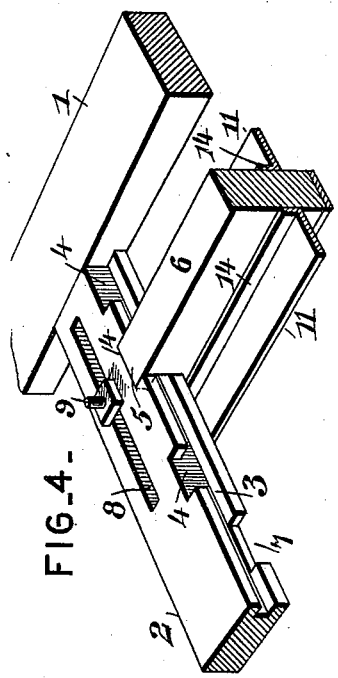
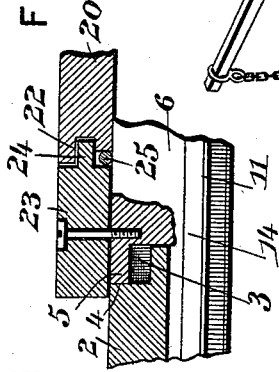
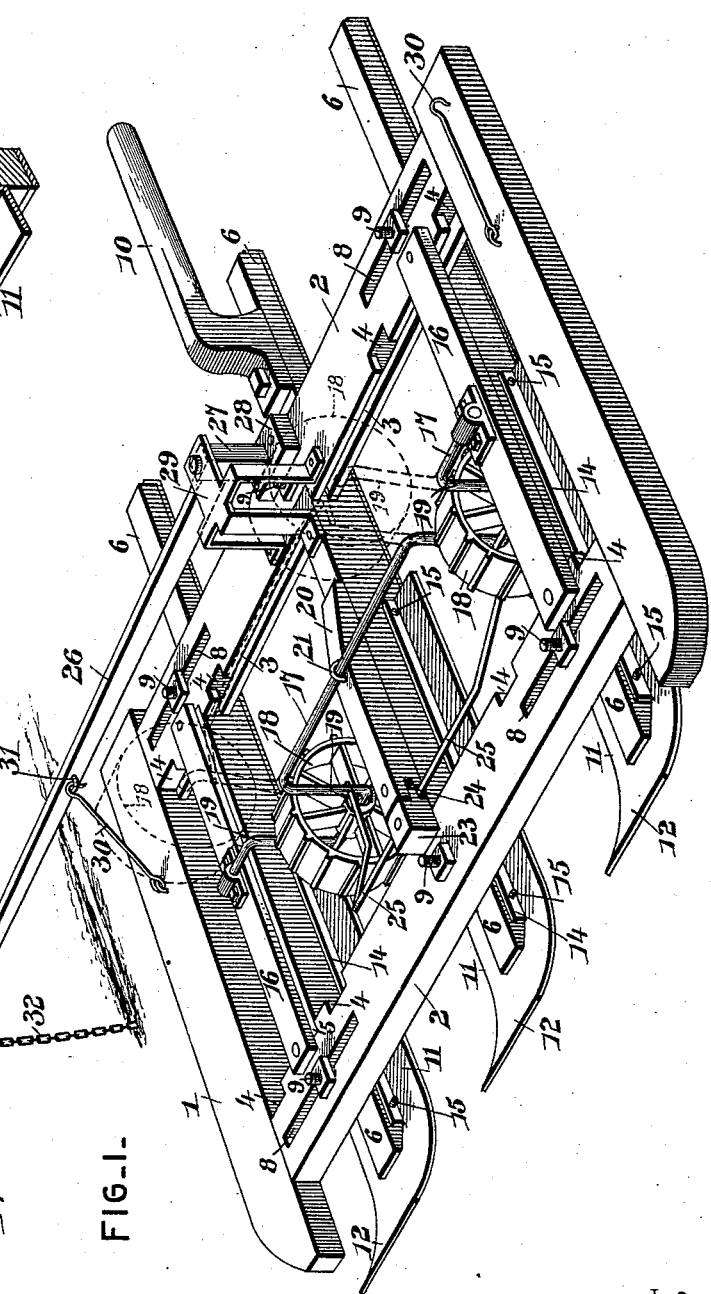
Witnesses
Jas. K. M<sup>c</sup>Cathran
V. B. Hillyard
Inventor
Charles Whitford
By his Attorneys,
C. A. Snow & Co.

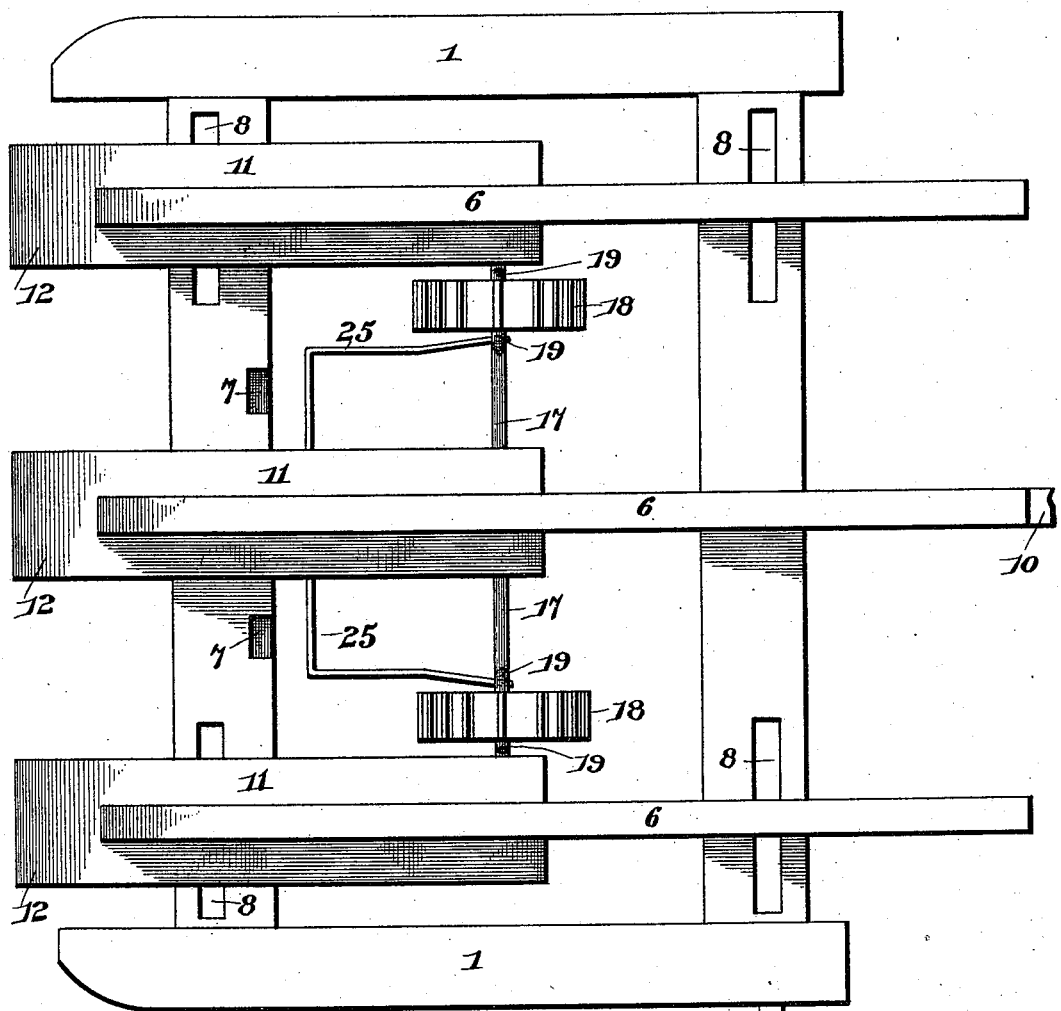

UNITED STATES PATENT OFFICE.

CHARLES WHITFORD, OF MILWAUKEE, WISCONSIN.

COMBINED PULVERIZER AND LAND-MARKER.

SPECIFICATION forming part of Letters Patent No. 574,468, dated January 5, 1897.

Application filed February 24, 1896. Serial No. 580,423. (No model.)

*To all whom it may concern:*

Be it known that I, CHARLES WHITFORD, a citizen of the United States, residing at Milwaukee, in the county of Milwaukee and State of Wisconsin, have invented a new and useful Combined Pulverizer and Land-Marker, of which the following is a specification.

This invention relates to agricultural implements, and aims to improve that class of machines designed for crushing clods, pulverizing the soil, and laying off the land for planting in rows.

The primary purpose of the invention is to provide combined markers and pulverizers and adjustably connect them with a frame, so that the soil can be marked or indented in rows at any required distance apart and simultaneously crushed or pulverized, thereby preparing the ground for the reception of the seed.

A further purpose of the invention is to combine with the frame ground-wheels for carrying the machine when turning at the end of the field or when moving over the latter prior to beginning the work of preparing and laying out the land.

A still further purpose of the invention is to improve the general construction of this class of machines, whereby they are rendered more effective, easier to handle, and whereby disabled parts can be quickly replaced without necessitating a loss of valuable time.

With these and such other objects as may accrue to the particular construction the invention may be said to consist in certain structural features and novel combinations of the parts, which hereinafter will be more fully set forth, illustrated, and claimed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—
Figure 1 is a perspective view of the improved machine, showing the ground-wheels in operative relation by full lines and turned back out of the way by dotted lines. Fig. 2 is a bottom plan view thereof. Fig. 3 is a detail view of a runner having the shoe applied thereto. Fig. 4 is a detail view showing the construction which admits of a disabled runner being substituted by a new one. Fig. 5 is a detail view of the provisions for securing the bail attached to the crank-shaft carrying the ground-wheels. Fig. 6 is a detail view of a shoe.

Corresponding and like parts are referred to in the following description and designated in the views of the drawings hereto attached by the same reference-characters.

The frame, as shown, is rectangular and comprises longitudinal beams 1 and front and rear transverse beams 2, connected at their ends to the longitudinal beams in any substantial manner. The transverse beams 2 have grooves 3 in their inner edges, and notches 4 open downward into the grooves 3 and are designed to receive projecting end portions 5 of the runners 6 to prevent the latter from lateral displacement. Other notches 7 open downward from the grooves 3 and admit of the projecting end portions 5 passing therethrough into the grooves 3 when it is required to remove a runner for any purpose or to replace it by a new one in the event of a runner becoming disabled.

Transverse slots 8 are provided at the ends of the transverse beams 2 and extend lengthwise of the latter, and receive bolts 9, by means of which the runners 6 are held to the transverse beams in the located position. The end notches 4 will be located opposite the slots 8, so that the projecting end portions 5 of the side runners may be fitted in any one of them and yet have the bolts 9 remain in the slots 8.

The runners 6 are similarly formed, and their lower portion is extended so as to come beneath the front and rear transverse beams and project beyond the latter to any required distance, and their front ends have their lower sides curved upwardly, so as to ride over the soil without plunging therein. For the sake of simplicity and economy of construction the runners are formed from wooden beams and are protected on their lower faces by metallic strips which receive the wear. The middle runner is stationary, and, like the side runners, is secured to the transverse beams by bolts 9. A handle 10 is attached to the projecting rear portion of the middle runner and is provided to enable the driver to balance the machine upon the ground-wheels when turning at the end of the field or when traveling over the latter.

The shoes 11 for pulverizing the soil and crushing the clods and lumps of earth are constructed alike and are secured to the runners in a similar way, and each is formed from a plate having its front end 12 curved upwardly and having a longitudinal space 13 midway of its edges and extending from the curved end 12 through the rear end of the plate and having vertical flanges 14 bordering upon the longitudinal space and adapted to engage with the opposite sides of a runner, to which they are secured by bolts 15 or other suitable fastenings. The vertical flanges 14 are formed by slitting the plate longitudinally midway of its edges and bending the portions of the plate adjacent to the slit, as will be readily understood. The curved ends 12 of the shoes come beneath the front curved ends of the runners, so as to ride over the ground and crush any lumps or clods that may come in their path. The shoes are applied to the runners in such a manner as to leave a portion of the runners projecting below the lower side of the shoes, so as to indent the soil and mark the same for the prescribed rows of seed.

Bars 16 are secured at their ends to the front and rear transverse beams 2 and are provided with bearings to receive the ends of the crank-shaft 17, which carries the ground-wheels 18, the latter being mounted upon the crank portions 19, near the ends of the said crank-shaft. A block 20 is secured to the top side of the middle runner and supports the middle portion of the crank-shaft, a staple or like fastening 21 being applied to the block and serving to connect the crank-shaft at a middle point thereto. The front end of the block 20 has a notch 22, and a pivoted block 23 has a tongue 24 to enter the notch 22 and is adapted to extend over the front end of a bail 25 and hold the latter against vertical movement when the ground-wheels are in position to carry and sustain the weight of the machine. The bail 25 has connection with the inner members of the crank portions 19, and when engaged beneath the tongue 24 serves to secure the ground-wheels in working relation. When the ground-wheels are not in service, the pivoted block is turned so as to release the bail 25, which latter is thrown upward and rearward, thereby lifting the ground-wheels and throwing them away from the surface of the land, as indicated by the dotted lines in Fig. 1.

The tracer for determining the correct position of the machine on the return trip consists of an arm 26, secured at its inner end to a post 27, obtaining bearings in a block 28, and a bracket 29, secured to the rear transverse beam at a point midway of the ends thereof. This arm 26 is adapted to be swung horizontally from one side of the machine to the other, so that its projecting end may be adjacent to that portion of the field previously prepared by the machine. Hooks 30 at the rear corners of the frame are adapted to engage with staples 31 on the pivoted arm 26, so as to hold the latter in the required position. A chain, rope, or cable 32 is attached to the free end of the arm 26 and is adapted to trail in the last mark or indentation made by the machine prior to its return trip, and this applies whether the machine is traveling over the field in the same or in opposite directions.

Having thus described the invention, what is claimed as new is—

1. In an agricultural implement, the combination of a frame comprising transverse beams having grooves in their inner sides, and having upper and lower notches extending into the grooves, runners having projecting end portions to pass through the lower notches and move in the said grooves, and adapted to enter any one of the said top notches, and means for securing the runners in the located position, substantially as set forth.

2. In an agricultural implement, the combination of a frame comprising transverse beams having slots and formed in their inner edges or sides with grooves, and having upper and lower notches, the upper notches being disposed opposite to the said slots, runners having projecting end portions to be passed through the lower notches into the grooves and adapted to enter any one of the upper notches, and bolts operating in the said slots and adapted to secure the runners in the located position, substantially as described.

3. In an agricultural implement, the combination with a runner, of a shoe applied thereto and formed from a plate having its front end curved and having a longitudinal space in the rear of the curved end and vertical flanges bordering upon the said longitudinal space to engage with the sides of the runner, and means for securing the shoe to the runner by passing through the said vertical flanges and the runner, substantially as set forth.

4. In an agricultural implement, the combination of a frame having a series of runners, a shaft journaled at and intermediate of its ends and having crank portions between its bearings, ground-wheels mounted upon the said crank portions of the shaft, a bail having direct and rigid attachment at its ends with the crank portions of the shaft, and a pivoted block having a portion to be brought into engagement with the horizontal part of the bail to hold the ground-wheels upon the ground, substantially as and for the purpose set forth.

5. In an agricultural implement, the combination with the frame bearing the earth-treating devices, a crank-shaft having ground-wheels mounted upon its crank portions, and a bail having rigid connection with the crank portions of the crank-shaft, of a block, and a pivoted block having a tongue adapted to be projected over the end of the bail and engage with the adjacent portion of the aforesaid block and hold the ground-wheels in contact with the ground, substantially as and for the purpose set forth.

In testimony that I claim the foregoing as my own I have hereto affixed my signature in the presence of two witnesses.

CHARLES WHITFORD.

Witnesses:
CHAS. F. WANDERER,
JOS. M. LEWIS.